United States Patent
Nicholson et al.

(10) Patent No.: US 10,791,417 B1
(45) Date of Patent: Sep. 29, 2020

(54) LOW-FUEL INDICATOR ENABLEMENT BASED ON FUEL STATION LOCATIONS

(71) Applicant: LENOVO (Singapore) PTE. LTD., New Tech Park (SG)

(72) Inventors: John Weldon Nicholson, Cary, NC (US); Daryl Cromer, Raleigh, NC (US); Howard Locker, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/368,765

(22) Filed: Mar. 28, 2019

(51) Int. Cl.
| | |
|---|---|
| *H04W 4/00* | (2018.01) |
| *H04W 4/021* | (2018.01) |
| *B60Q 3/16* | (2017.01) |
| *G01F 9/00* | (2006.01) |
| *B60Q 9/00* | (2006.01) |
| *B60Q 5/00* | (2006.01) |

(52) U.S. Cl.
CPC ............ *H04W 4/021* (2013.01); *B60Q 3/16* (2017.02); *B60Q 5/005* (2013.01); *B60Q 9/00* (2013.01); *G01F 9/001* (2013.01)

(58) Field of Classification Search
CPC ......... H04W 4/021; B60Q 3/16; B60Q 5/005; B60Q 9/00
USPC ........ 340/990, 991, 992, 993; 701/200, 208, 701/209, 211, 212, 213, 426, 431
See application file for complete search history.

(56) References Cited

U.S. PATENT DOCUMENTS

| | | | |
|---|---|---|---|
| 8,730,023 B1* | 5/2014 | Kumar ................... | G07C 5/004 340/450.2 |
| 2009/0109022 A1* | 4/2009 | Gangopadhyay .. | G01C 21/3407 340/540 |
| 2009/0173311 A1* | 7/2009 | Roberts ............... | B60W 30/182 123/198 F |
| 2012/0116670 A1* | 5/2012 | Rosekrans ......... | G01C 21/3469 701/426 |
| 2012/0223844 A1* | 9/2012 | Giuli ..................... | G08G 1/205 340/993 |
| 2013/0065613 A1* | 3/2013 | Stopel .................... | H04W 4/18 455/456.3 |
| 2013/0178233 A1* | 7/2013 | McCoy ................. | H04W 4/021 455/456.3 |
| 2014/0058895 A1* | 2/2014 | Herron ................... | G06Q 30/02 705/26.41 |
| 2015/0356868 A1* | 12/2015 | Cuende Alonso ..... | G01C 21/36 382/104 |
| 2017/0148113 A1* | 5/2017 | Yasko ................... | G06Q 50/06 |
| 2017/0363432 A1* | 12/2017 | Hall ..................... | G01C 21/3469 |
| 2017/0363456 A1* | 12/2017 | Tomita ............... | G01C 21/3679 |
| 2018/0068497 A1* | 3/2018 | Kurtz ..................... | G01S 19/14 |

(Continued)

*Primary Examiner* — Ojiako K Nwugo
(74) *Attorney, Agent, or Firm* — Kunzler Bean & Adamson

(57) ABSTRACT

Apparatuses, methods, systems, and program products are disclosed for low-fuel indicator enablement based on fuel station locations. An apparatus includes a processor and a memory that stores code executable by the processor. The memory stores code executable by the processor to calculate a current fuel range for a vehicle. The memory stores code executable by the processor to determine locations of fuel stations within a proximity of the vehicle. The memory stores code executable by the processor to enable a low-fuel indicator for the vehicle in response to the current fuel range of the vehicle being less than a threshold fuel range as determined based on the locations of the fuel stations.

20 Claims, 8 Drawing Sheets

(56) References Cited

U.S. PATENT DOCUMENTS

2018/0240098 A1* 8/2018 You .................... G06Q 20/3224
2019/0037345 A1* 1/2019 Gao ........................ G06F 16/00

* cited by examiner

LOW-FUEL INDICATOR ENABLEMENT BASED ON FUEL STATION LOCATIONS

FIELD

The subject matter disclosed herein relates to a vehicle's low-fuel indicator, and more particularly relates to dynamically enabling the low-fuel indicator based on the vehicle's fuel range and the distances to fuel stations.

BACKGROUND

Vehicles usually come equipped with a low-fuel indicator that lights up when the remaining fuel level in the vehicle hits a predetermined amount. However, based on the vehicle's location, the remaining amount of fuel may not be enough to get the vehicle to a fuel station.

BRIEF SUMMARY

Apparatuses, methods, systems, and program products are disclosed for low-fuel indicator enablement based on fuel station locations. An apparatus, in one embodiment, includes a processor and a memory that stores code executable by the processor. The memory, in certain embodiments, stores code executable by the processor to calculate a current fuel range for a vehicle. The memory, in various embodiments, stores code executable by the processor to determine locations of fuel stations within a proximity of the vehicle. The memory, in some embodiments, stores code executable by the processor to enable a low-fuel indicator for the vehicle in response to the current fuel range of the vehicle being less than a threshold fuel range as determined based on the locations of the fuel stations.

A method for low-fuel indicator enablement based on fuel station locations includes, in one embodiment, calculating, by a processor, a current fuel range for a vehicle. The method, in some embodiments, includes determining locations of fuel stations within a proximity of the vehicle. The method, in various embodiments, includes enabling a low-fuel indicator for the vehicle in response to the current fuel range of the vehicle being less than a threshold fuel range as determined based on the locations of the fuel stations.

A program product for low-fuel indicator enablement based on fuel station locations, in one embodiment, includes a computer readable storage medium that stores code executable by a processor. In some embodiments, the executable code includes code to perform calculating a current fuel range for a vehicle. The executable code, in certain embodiments, includes code to perform determining locations of fuel stations within a proximity of the vehicle. The executable code, in certain embodiments, includes code to perform enabling a low-fuel indicator for the vehicle in response to the current fuel range of the vehicle being less than a threshold fuel range as determined based on the locations of the fuel stations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
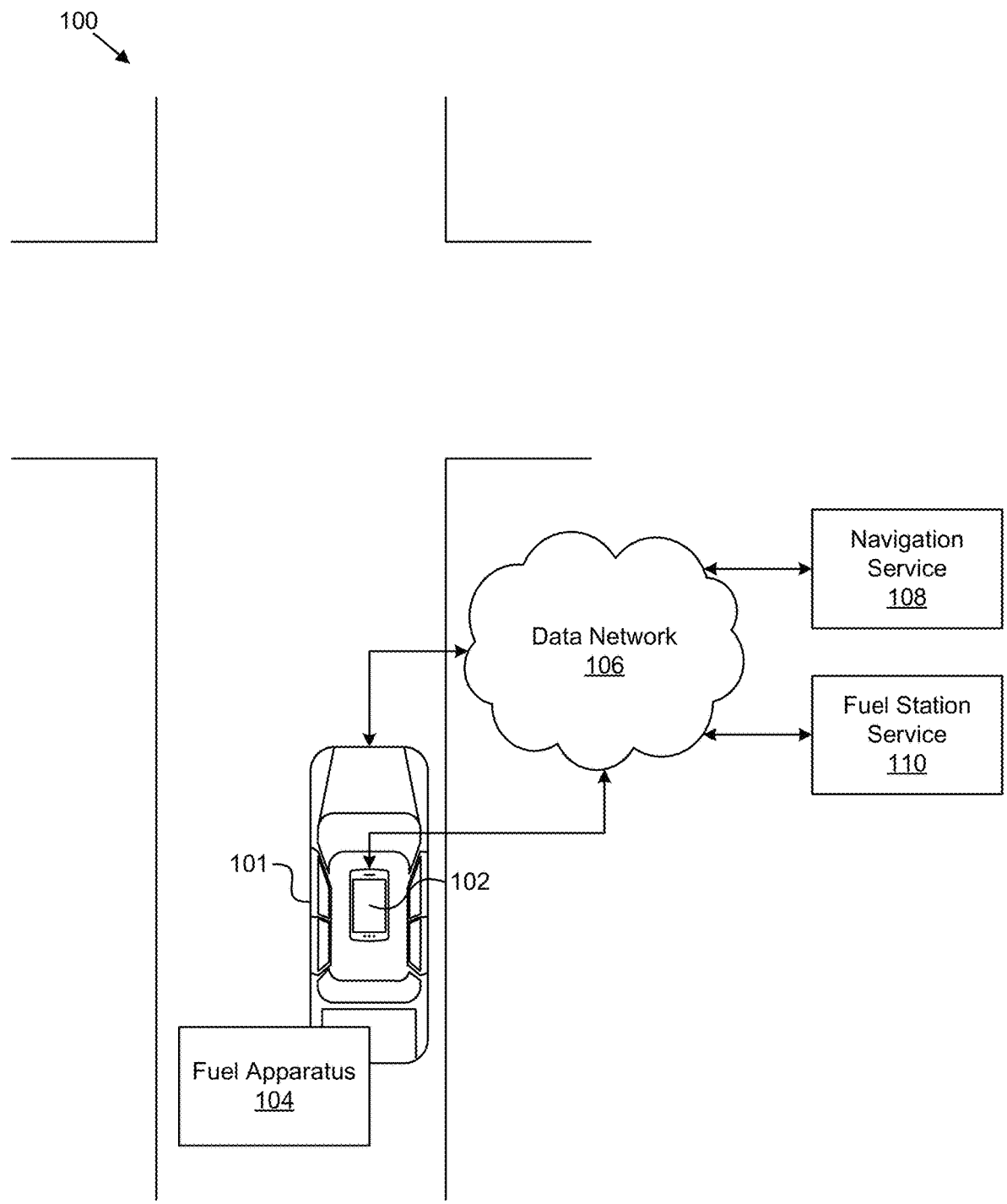
FIG. 1 is a schematic block diagram illustrating one embodiment of a system for low-fuel indicator enablement based on fuel station locations.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Apparatuses, methods, systems, and program products are disclosed for low-fuel indicator enablement based on fuel station locations. An apparatus, in one embodiment, includes a processor and a memory that stores code executable by the processor. The memory, in certain embodiments, stores code executable by the processor to calculate a current fuel range for a vehicle. The memory, in various embodiments, stores code executable by the processor to determine locations of fuel stations within a proximity of the vehicle. The memory, in some embodiments, stores code executable by the processor to enable a low-fuel indicator for the vehicle in response to the current fuel range of the vehicle being less than a threshold fuel range as determined based on the locations of the fuel stations.

In one embodiment, the code is further executable by the processor to determine a density of fuel stations within a first geographic area based on the locations of the fuel stations; setup boundaries of a first geofence area for the first geographic area based on the determined density of fuel stations, the first geofence area defining the threshold fuel range; and enable the low-fuel indicator of the vehicle in response to the current fuel range of the vehicle being less than the threshold fuel range for the first geofence area while the vehicle is within the first geofence area.

In some embodiments, the code is further executable by the processor to determine a density of fuel stations within a second geographic area based on the locations of the fuel stations, the second geographic area adjacent to the first geographic area; setup boundaries of a second geofence area for the second geographic area based on the determined density of fuel stations within the second geographic area, the second geofence area defining a second threshold fuel range, the second threshold fuel range different than the threshold fuel range; and enable the low-fuel indicator of the vehicle in response to the current fuel range of the vehicle being less than the second threshold fuel range for the second geofence area while the vehicle is within the second geofence area.

In one embodiment, the code is further executable by the processor to detect when the vehicle leaves the first geofence area and moves into the second geofence area; receive the second fuel range threshold for the second geofence area in response to the vehicle moving into the second geofence area; and enable the low-fuel indicator of the vehicle in response to the current fuel range of the vehicle being less than the second threshold fuel range for the second geofence area.

In some embodiments, the first geographic area is selected in response to a population density for the first geographic area satisfying a population density threshold. In further embodiments, the threshold fuel range for the first geofence area is determined as a function of distances between the fuel stations within the first geofence area.

In various embodiments, the code is further executable by the processor to determine a plurality of the fuel stations that are located along a route that the vehicle is travelling on; determine distances from the vehicle to each of the plurality of fuel stations and distances between each of the plurality of fuel stations, the threshold fuel range comprising the fuel range necessary to reach one or more fuel stations past the next fuel station along the route; and enable the low-fuel indicator for the vehicle in response to the current fuel range of the vehicle being less than the threshold fuel range.

In some embodiments, the route is preprogrammed in a navigation system, the plurality of fuel stations selected based on the preprogrammed route. In one embodiment, the route is dynamically determined according to a direction that the vehicle is traveling, the plurality of fuel stations selected based on the route that the vehicle is currently traveling on.

In some embodiments, the code is further executable by the processor to constantly monitor the current fuel range of the vehicle and compare the current fuel range to the threshold fuel range to determine whether to enable the low-fuel indicator. In various embodiments, the fuel range is calculated as a function of an amount of gas remaining in a gas tank of the vehicle and/or an amount of electrical charge remaining in one or more batteries of the vehicle.

A method for low-fuel indicator enablement based on fuel station locations includes, in one embodiment, calculating, by a processor, a current fuel range for a vehicle. The method, in some embodiments, includes determining locations of fuel stations within a proximity of the vehicle. The method, in various embodiments, includes enabling a low-fuel indicator for the vehicle in response to the current fuel range of the vehicle being less than a threshold fuel range as determined based on the locations of the fuel stations.

In one embodiment, the method includes determining a density of fuel stations within a first geographic area based on the locations of the fuel stations; setting up boundaries of a first geofence area for the first geographic area based on the determined density of fuel stations, the first geofence area defining the threshold fuel range; and enabling the low-fuel indicator of the vehicle in response to the current fuel range of the vehicle being less than the threshold fuel range for the first geofence area while the vehicle is within the first geofence area.

In one embodiment, the method includes determining a density of fuel stations within a second geographic area based on the locations of the fuel stations, the second geographic area adjacent to the first geographic area; setting up boundaries of a second geofence area for the second geographic area based on the determined density of fuel stations within the second geographic area, the second geofence area defining a second threshold fuel range, the second threshold fuel range different than the threshold fuel range; and enabling the low-fuel indicator of the vehicle in response to the current fuel range of the vehicle being less than the second threshold fuel range for the second geofence area while the vehicle is within the second geofence area.

In certain embodiments, the method includes detecting when the vehicle leaves the first geofence area and moves into the second geofence area; receiving the second fuel range threshold for the second geofence area in response to the vehicle moving into the second geofence area; and enabling the low-fuel indicator of the vehicle in response to the current fuel range of the vehicle being less than the second threshold fuel range for the second geofence area.

In some embodiments, the method includes determining a plurality of the fuel stations that are located along a route that the vehicle is travelling on; determining distances from the vehicle to each of the plurality of fuel stations and distances between each of the plurality of fuel stations, the threshold fuel range comprising the fuel range necessary to reach one or more fuel stations past the next fuel station along the route; and enabling the low-fuel indicator for the vehicle in response to the current fuel range of the vehicle being less than the threshold fuel range.

In one embodiment, the route is preprogrammed in a navigation system, the plurality of fuel stations selected based on the preprogrammed route. In certain embodiments, the route is dynamically determined according to a direction that the vehicle is traveling, the plurality of fuel stations selected based on the route that the vehicle is currently traveling on. In certain embodiments, the method includes constantly monitoring the current fuel range of the vehicle and compare the current fuel range to the threshold fuel range to determine whether to enable the low-fuel indicator.

A program product for low-fuel indicator enablement based on fuel station locations, in one embodiment, includes a computer readable storage medium that stores code executable by a processor. In some embodiments, the executable code includes code to perform calculating a current fuel range for a vehicle. The executable code, in certain embodiments, includes code to perform determining locations of fuel stations within a proximity of the vehicle. The executable code, in certain embodiments, includes code to perform enabling a low-fuel indicator for the vehicle in response to the current fuel range of the vehicle being less than a threshold fuel range as determined based on the locations of the fuel stations.

FIG. 1 is a schematic block diagram illustrating one embodiment of a system 100 for low-fuel indicator enablement based on fuel station locations. In one embodiment, the system 100 includes one or more vehicles 101, one or more information handling devices 102, one or more fuel apparatuses 104, one or more data networks 106, and one or more services such as navigation services 108 and/or fuel station services 110. In certain embodiments, even though a specific number of the foregoing components are depicted in FIG. 1, one of skill in the art will recognize, in light of this disclosure, that any number of components may be included in the system 100.

In one embodiment, the system 100 includes one or more vehicles 101. The vehicles 101 may comprise cars, trucks, sport-utility vehicles, semi-trucks, motorcycles, boats or other watercraft, and/or the like. In certain embodiments, the vehicles 101 have internal combustion engines such as gas engines, diesel engines, hybrid engines (e.g., a combination of electric and internal combustion), natural gas engines, and/or the like. In some embodiments, the vehicles 101 are electric vehicles that run on 100% electric power provided from batteries, solar panels, and/or the like. In certain embodiments, the vehicles 101 are equipped with a low-fuel indicator such as a dashboard light, a sound or alarm, a message presented on a display (e.g., presented on an on-board navigation system display), an audio message, and/or other notification that indicates when the amount of fuel remaining in the vehicle 101 or the amount of charge remaining in the batteries reaches a threshold value that is dynamically determined based on the vehicle's location and the locations of fuel stations within a proximity of the vehicle 101, as described in more detail below. As used herein, a fuel station may comprise a facility that sells fuel such as gas, diesel, natural gas, or the like that can be used to refill a vehicle 101 and/or has charging stations for charging batteries for electric vehicles.

In one embodiment, the system 100 includes one or more information handling devices 102, which may be located within a vehicle 101, e.g., such as the driver's smart phone, wirelessly connected to the vehicle 101 over a short-range wireless network, e.g., Bluetooth® or connected to the vehicle 101 over a wired connection, e.g., a USB connection, and/or otherwise integrated into the vehicle's on-board computer system. The information handling devices 102 may include a mobile device such as a laptop computer, a tablet computer, a smart phone, a smart watch, a fitness band or other wearable activity tracking device, an optical head-mounted display (e.g., a virtual reality headset, smart glasses, or the like), a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In one embodiment, the fuel apparatus 104 is configured to calculate a fuel range for a vehicle 101, determine locations of fuel stations that are within a proximity of the vehicle 101, and enable a low-fuel indicator for the vehicle 101 in response to the current fuel range of the vehicle 101 being less than a threshold fuel range as determined based on the locations of the fuel stations. The fuel apparatus 104, including its various sub-modules, may be located on one or more vehicles 101, on one or more information handling devices 102 in the system 100, on one or more network devices, and/or the like. The fuel apparatus 104 is described in more detail below with reference to FIGS. 2 and 3.

In one embodiment, the fuel apparatus 104 improves upon conventional low-fuel indicator systems because the fuel apparatus 104 considers the locations of fuel stations relative to the vehicle's location and the vehicle's fuel range to determine when to enable the low-fuel indicator in the vehicle 101. Conventional systems merely set a threshold for the amount of fuel remaining in the vehicle 101 and then enable the low-fuel indicator when the amount of fuel reaches the threshold level. For example, the threshold level may be set to two gallons such that when the vehicle 101 has two gallons of fuel remaining, the low-fuel indicator will be enabled, even if that amount of fuel is not enough to get the vehicle 101 to a fuel station.

In various embodiments, the fuel apparatus 104 may be embodied as a hardware appliance that can be installed or deployed on an information handling device 102, on a vehicle 101, or elsewhere on the data network 106. In certain embodiments, the fuel apparatus 104 may include a hardware device such as a secure hardware dongle or other hardware appliance device that attaches to a device such as a vehicle's on-board computer system, a laptop computer, a tablet computer, a smart phone, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the fuel apparatus 104 may include a power interface, a wired and/or wireless network interface, a graphical interface that attaches to a display, and/or a semiconductor integrated circuit device as described below, configured to perform the functions described herein with regard to the fuel apparatus 104.

The fuel apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the fuel apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the fuel apparatus 104.

The semiconductor integrated circuit device or other hardware appliance of the fuel apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the fuel apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

In certain embodiments, the information handling device 102 and/or an internal computing device for the vehicle 101 is wirelessly connected to a data network 106. The data network 106, in one embodiment, includes a digital communication network that transmits digital communications. The data network 106 may include a wireless network, such as a wireless cellular network, a local wireless network, such as a Wi-Fi network, an ad hoc network, and/or the like. The data network 106 may include a wide area network ("WAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a cellular telephone network communication. All standards and/or connection types include the latest version and revision of the standard and/or connection type as of the filing date of this application.

In one embodiment, the navigation service 108 provides navigation information for planning, mapping, and/or displaying the vehicle's route. The route may be predicted based on the direction that the vehicle 101 is going or may be programmed or pre-determined by a user and may be presented on a map on a display within the vehicle 101. The navigation service 108 may provide additional information along the vehicle's route such as locations of fuel stations, points of interest, restaurants, and/or the like.

In one embodiment, the fuel station service 110 may locate, manage, receive, determine, or the like locations of fuel stations that are within a proximity of the vehicle's location. The fuel station service may identify gas stations, charging stations, and/or the like that are located within a predetermined distance of the vehicle 101, located within a predetermined diameter of the vehicle's location, and/or the like. The navigation service 108 may communicate with the fuel station service 110 to identify and map the fuel stations onto a navigation map presented in the vehicle 101.

Figure 2:
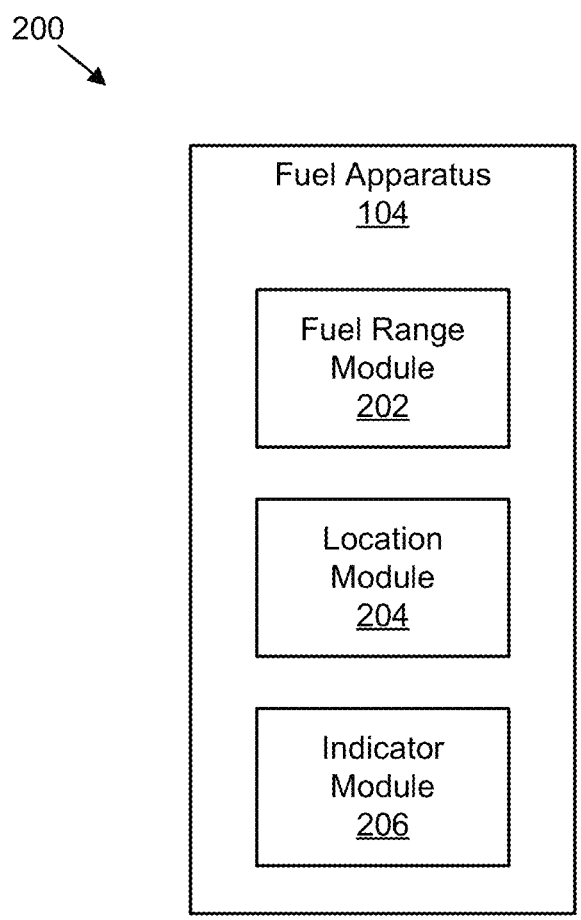
FIG. 2 is a schematic block diagram illustrating one embodiment of an apparatus for low-fuel indicator enablement based on fuel station locations.

FIG. 2 is a schematic block diagram illustrating one embodiment of an apparatus 200 for low-fuel indicator enablement based on fuel station locations. In one embodiment, the apparatus 200 includes an embodiment of a fuel apparatus 104. The fuel apparatus 104, in some embodiments, includes one or more of a fuel range module 202, a location module 204, and an indicator module 206, which are described in more detail below.

In one embodiment, the fuel range module 202 is configured to calculate a current fuel range for a vehicle 101, e.g., an average fuel range, a maximum fuel range, or the like. As used herein, the fuel range may refer to the total distance (miles or kilometers) the vehicle 101 can go before it needs to be refueled. The fuel range module 202, for instance, may calculate an average fuel efficiency, e.g., miles per gallon or kilometers per liter, for the vehicle 101 based on an amount of fuel that is used to travel a distance. Based on the fuel efficiency, the fuel range module 202 may predict, forecast, or otherwise calculate a distance that the vehicle 101 can travel on the remaining amount of fuel (or battery charge) in the vehicle 101.

In one embodiment, the location module 204 is configured to determine locations of fuel stations within a proximity of the vehicle 101. The location module 204 may communicate with the fuel station service 110 to determine the locations of fuel stations that are within a diameter, geographic area, or driving distance of the vehicle 101, either behind or ahead of the vehicle's route. The location module 204, for instance, may use an application programming interface ("API"), or the like, that the fuel station service 110 provides to provide the vehicle's location (e.g., GPS coordinates) and a search distance relative to the vehicle's location to the fuel station service and receive the locations of the fuel stations within the search distance of the vehicle's location.

In one embodiment, the indicator module 206 is configured to enable a low-fuel indicator for the vehicle 101 in response to the current fuel range for the vehicle 101 being less than a threshold fuel range, which may be determined based on the locations of the fuel stations. For instance, the threshold fuel range may be determined based on the locations of fuel stations within a predefined geographic area relative to the vehicle 101, as discussed below with reference to the geofence module 302. The threshold fuel range may also be determined according to the distance to the next fuel station, or the distance to the fuel station after the next fuel station, and/or the like, as discussed below with reference to the route module 304.

Accordingly, if the current fuel range for the vehicle 101 is less than (or equal to) the threshold fuel range, is greater than the threshold fuel range by a predefined amount (e.g., two gallons), or the like, then the indicator module 206 may enable a low-fuel indicator. The low-fuel indicator may be a dashboard light, signal, emblem, sign, message, or the like; a sound; an alarm; an audio message; and/or any combination of the foregoing. The indicator module 206 may further provide navigation instructions, e.g., directions to the next fuel station that the navigation service 108 provides in response to the low-fuel indicator being enabled.

In some embodiments, the fuel range module 202 constantly, periodically, consistently, or the like monitors or calculates the current fuel range for the vehicle 101, which may change over time based on the amount of fuel in the vehicle 101, the vehicle's speed, the wind resistance, the terrain the vehicle 101 is travelling on, real-time traffic conditions (e.g., using data from Waze® and/or other traffic applications), etc., and compares the current fuel range to the threshold fuel range to determine whether the indicator module 206 should enable the low-fuel indicator.

Figure 3:
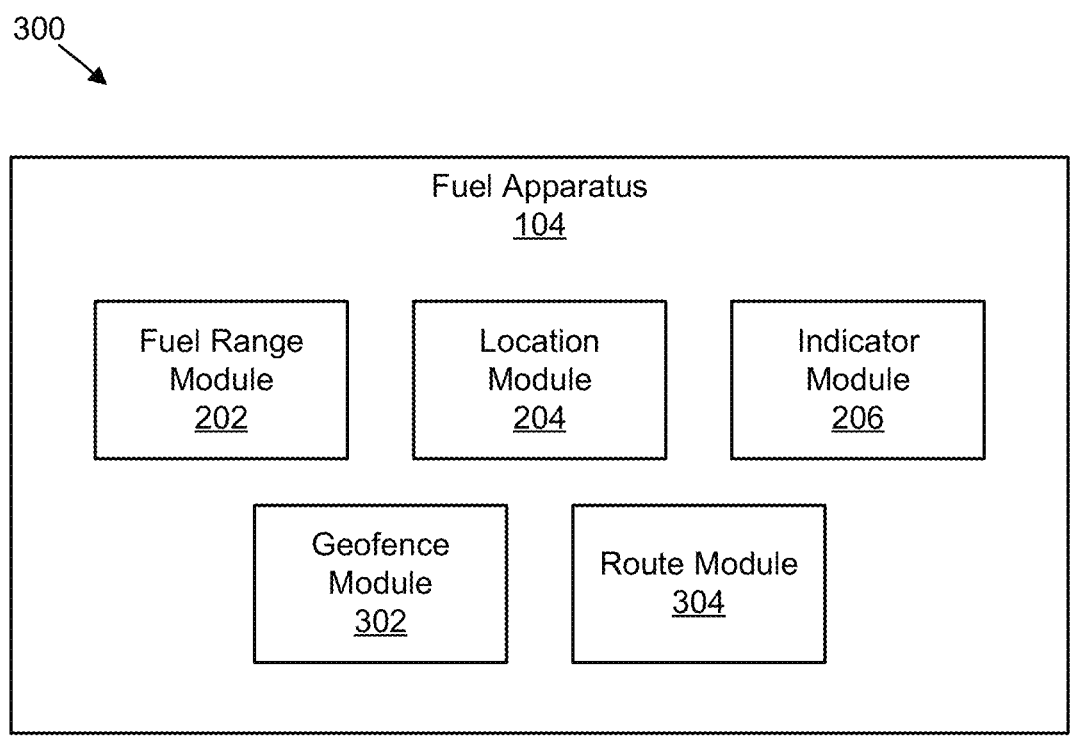
FIG. 3 is a schematic block diagram illustrating one embodiment of another apparatus for low-fuel indicator enablement based on fuel station locations.

FIG. 3 is a schematic block diagram illustrating one embodiment of an apparatus 300 for low-fuel indicator enablement based on fuel station locations. In one embodiment, the apparatus 300 includes an embodiment of a fuel apparatus 104. The fuel apparatus 104, in some embodiments, includes one or more of a fuel range module 202, a location module 204, and an indicator module 206, which may be substantially similar to the fuel range module 202, the location module 204, and the indicator module 206 described above with reference to FIG. 2. In further embodiments, the fuel apparatus 104 includes one or more of a geofence module 302 and a route module 304, which are described in more detail below.

The geofence module 302, in one embodiment, is configured to determine and define a geofence for a geographic area that defines the threshold fuel range for the geographic area. As used herein, a geofence may comprise a virtual perimeter for a real-world geographic area. The virtual perimeter for a geofence may have various shapes and sizes, e.g., rectangular, circular, or some other define or abstract shape. In some embodiments, geofences may overlap with other geofences, may border adjacent geofences, may be separated from other geofences by a non-geofence area, and/or the like. In certain embodiments, the boundaries of the geofence may be detected using various sensors on the vehicle 101 and/or an information handling device 102 within the vehicle. The sensors, for example, may include wireless signal sensors, cellular signal receivers, location sensors (e.g., global positioning system ("GPS") sensors), and/or the like.

In certain embodiments, the geofence module 302 may communicate with or utilize a location-based service to define the geofence for a geographic area. The geofence module 302 may further provide information about the defined geofences to a vehicle 101 or an information handling device 102 in response to a request for the geofence area, in response to the vehicle 101 or information handling device 102 entering the geographic area for a geofence, and/or the like. For example, the vehicle navigation system may periodically poll the geofence module 302 for the boundaries of a geofence that the vehicle 101 is in or is proximate to. In another example, the geofence module 302 may run on the vehicle's computer system or on an information handling device 102 in the vehicle 101 and may periodically provide the vehicle's location to a geofence module 302 running on a remote server to determine an identifier for the geofence that the vehicle 101 is in and/or other information (e.g., fuel range threshold information for the geofence area).

In one embodiment, the geofence module 302 determines a density of fuel stations that are within a geographic area based on the locations of the fuel stations. As used herein, fuel station density may be a measurement of fuel stations per unit area, per population, and/or the like. In such an embodiment, the geofence module 302 may communicate with, access, or the like the fuel station service 110 to determine the locations of the fuel stations within a geographic area and the density of the fuel stations for the geographic area. The geographic area, for instance, may be a predefined bounded area such as a country, a state, a county, a providence, a city, a town, a district, a neighborhood, and/or the like. The geographic area, in one embodiment, may be determined based on a population density of the geographic area. For example, the geographic area may comprise an area that satisfies a population density threshold, e.g., a thousand people, ten-thousand people, etc. up to a maximum population density, e.g., fifty-thousand people, a hundred-thousand people, or the like, which may be indicative of the number of fuel stations within the geographic area. The geographic area may be determined in response to the fuel station density of an area satisfying a predefined fuel station density, e.g., four fuel stations for every square mile, or the like.

In one embodiment, the geofence module 302 defines the geofence area for a geographic area based on the population density and the fuel station density. For example, a geofence area may be an area that has a fuel station-to-population ratio of one fuel station for every five hundred people in the area, or the like. The geofence area may also be determined based on distances between fuel stations, distances between population centers, distances between truck stops, and/or the like relative to the average fuel range of vehicles 101 in the area. In other words, the geofence area may be larger in rural areas where there is a greater distance between fuel stations and the average fuel range of vehicles 101 in the area is enough to reach each fuel station from a different fuel station, or the geofence area may be smaller to cover population centers or metropolitan areas where there are a high number of fuel stations within a short distance of one another.

The geofence area may be used to define the threshold fuel range that is used to determine when to enable the low-fuel indicator of a vehicle 101. The threshold fuel range, for example, may be determined based on the average fuel range for vehicles 101 in a geofence area. For example, the geofence module 302 may access a database, server, or other third-party data source to determine the average fuel range for vehicles 101 in a particular geographic area, and may determine the distance from one end of the geofence area to the opposite end to establish the threshold fuel range for the geofence area as the amount of fuel it takes to get across the geofence area. Other measurements may be used, such as the average distance between fuel stations within the geofence area to determine the threshold fuel range for the geofence area. Thus, the threshold fuel range may be the fuel range that is necessary to reach the fuel station after the next fuel station, to reach the edge of the geofence area, to reach the furthest fuel station from the vehicle's position within the geofence area, and/or the like.

In certain embodiments, when the vehicle 101 is within the geofence area, the geofence module 302 may receive the threshold fuel range for the geofence area, e.g., from a remote server running an instance of the geofence module 302 and may determine if the current fuel range for the vehicle 101 satisfies (e.g., is equal to or less than) the threshold fuel range for the geofence area. If so, then the indicator module 206 may enable the low-fuel indicator for the vehicle 101. Thus, unlike conventional systems that enable the low-fuel indicator based solely on the amount of fuel remaining in the vehicle 101, e.g., two gallons of gas, the fuel apparatus 104 dynamically defines a geofence area for a geographic area based on the fuel station and/or population density for the geographic area, and dynamically enables the low-fuel indicator for the vehicle 101 based on the current fuel range for the vehicle 101 satisfying the fuel range threshold for the geofence area.

For instance, as an example of the dynamic nature of the fuel apparatus 104, if there are two adjacent geofence areas, each with a different threshold fuel range, as the vehicle 101 moves from one geofence area to another, its low-fuel indicator may be enabled or disabled based on the threshold fuel range for the geofence area that the vehicle 101 moves into and the current fuel range of the vehicle 101. For example, if the vehicle 101 leaves a geofence area for a city and moves into a geofence area for a rural area, which has a higher fuel range threshold, the vehicle's low-fuel indicator may be enabled if the fuel range for the vehicle 101 is less than the threshold fuel range for the rural geofence area even though the vehicle's current fuel range may be sufficient to get to a fuel station for the geofence area in the city.

In one embodiment, the route module 304 is configured to determine a threshold fuel range for enabling the low-fuel indicator on a vehicle 101 based on distances between the vehicle 101 and one or more fuel stations along a route that the vehicle 101 is on. In one embodiment, the route module 302 may be integrated with a vehicle's navigation system, a navigation system on the information handling device 102, and/or may communicate with a navigation service 108 to determine the locations of the fuel stations along the vehicle's route, both in front of the vehicle 101, behind the vehicle 101, and to the sides of the vehicle 101. For example, if the vehicle 101 is travelling north, the route module 304 may determine locations of fuel stations north, south, east, and west of the vehicle 101.

In one embodiment, the route module 304 determines distances from the vehicle 101 to each of fuel station along the vehicle's route and distances between each fuel station. In such an embodiment, the route module 304 may define the threshold fuel range as the fuel range necessary to reach one or more fuel stations beyond or past the next or closest fuel station along the vehicle's route. Accordingly, the indicator module 206 may enable the low-fuel indicator for the vehicle 101 in response to vehicle's current fuel range satisfying (e.g., being less than or equal to) the threshold fuel range. For example, the route module 304 may compare the current fuel range to the distances to the next two gas stations along the vehicle's route. In other words, the threshold fuel range would be the amount of fuel necessary to get to the fuel station after the next fuel station. If the vehicle's current fuel range is enough to get to the next fuel station, but not enough to get to the fuel station after the next fuel station, then the indicator module 206 may enable the low-fuel indicator for the vehicle 101.

In certain embodiments, the vehicle's route may be programmed into a navigation system, e.g., on the vehicle 101 or on a user's information handling device 102, and the route module 304 may determine the locations of fuel stations based on the programmed route. For instance, the route module 304 may only locate fuel stations that are along the vehicle's programmed route, or fuel stations that are a predefined distance from the user's route. In certain embodiments, the route module 304 dynamically determines, estimates, or forecasts the vehicle's route based on the direction that the vehicle 101 is travelling, based on information from a navigation program, a web browser, social media activity, and/or other applications executing on an information handling device 102.

For instance, the route module 304 may execute on the user's information handling device 102 to monitor the user's search activity, social media activity, email conversations, text messages, and/or the like. The user, for example, may search for specific points of interest along a route such as restaurants, museums, or other attractions; may search for directions using a mapping application; may search for hotels using a hotel booking application; may search for events using an event scheduling application; and/or the like. The route module 304 may use this information to predict the user's destination and one or more routes to arrive at the destination, in addition to tracking the direction that the user is travelling in.

Figure 4A:
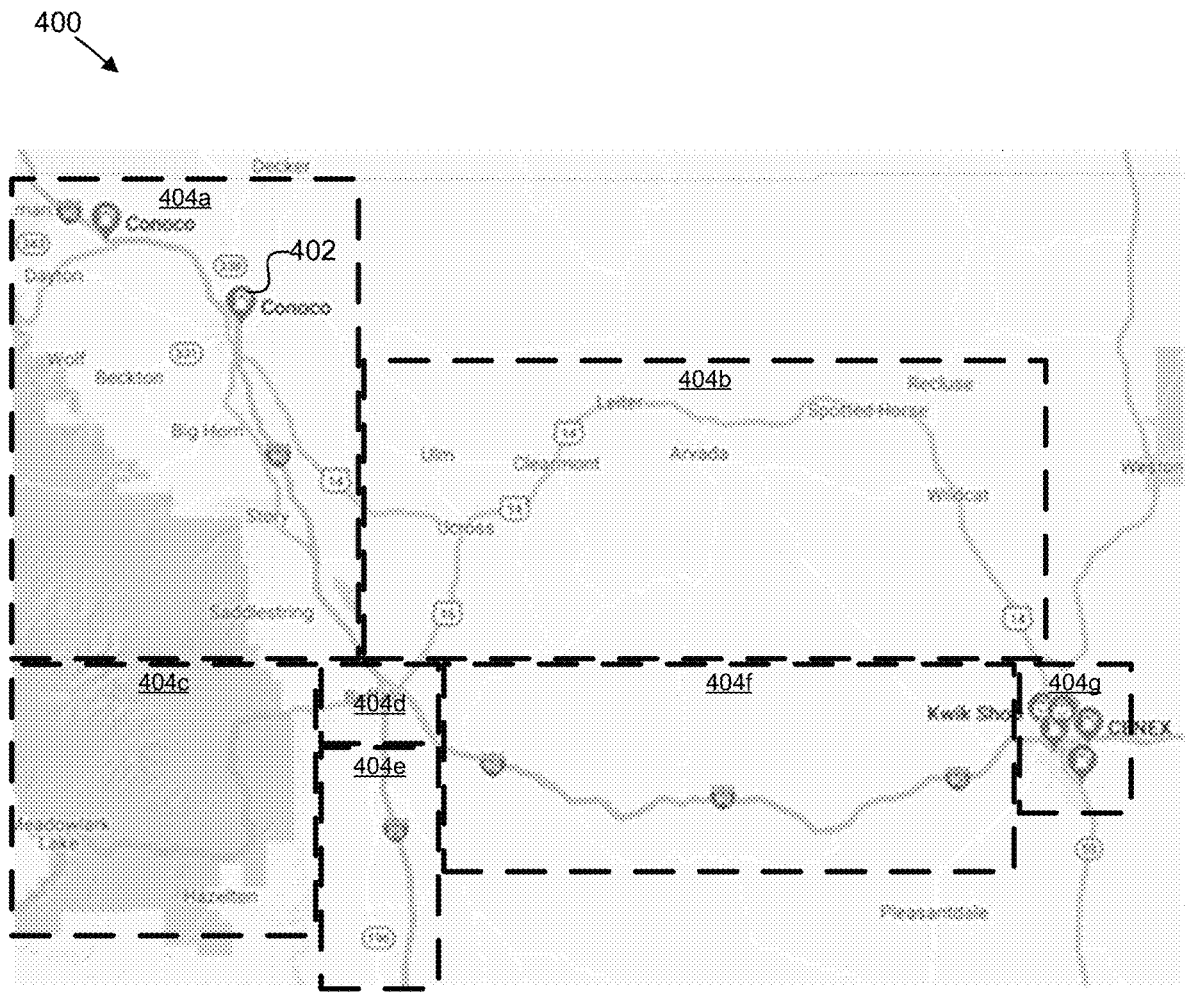
FIG. 4A illustrates one embodiment of using geofences for low-fuel indicator enablement based on fuel station locations.

FIG. 4A illustrates one embodiment of using geofences for low-fuel indicator enablement based on fuel station locations. In one embodiment, the location module 204 may determine the locations of various fuel stations 402 within a vicinity or proximity of a vehicle 101 travelling along a route. The geofence module 302 may determine a plurality of geofence areas 404a-g for the geographic area. As explained above, the geofence areas 404a-g may be determined based on a fuel station density for an area, a population density for an area, distances between fuel stations, or a combination of the foregoing.

In one embodiment, each geofence area 404a-g has an associated fuel range threshold that is determined according to the distances between the fuel stations in the geofence area 404a-g. For example, the fuel range threshold may be based on the maximum distance between fuel stations within the geofence area 404a-g. In another example, the fuel range threshold may be based on the average distance between fuel stations in the geofence area 404a-g. Accordingly, the indicator module 206 may enable the low-fuel indicator if the current fuel range of the vehicle 101 satisfies (e.g., is less than or equal to) the fuel range threshold for the geofence area 404a-g.

In certain embodiments, the geofence module 302 constantly monitors the vehicle's location and detects when the vehicle 101 leaves one geofence area 404a-g and enters and different geofence area 404a-g, which may have a different fuel range threshold than the geofence area 404a-g that the vehicle 101 just left. For instance, a rural geofence area 404f may have a threshold fuel range of 100 miles due to the lack of fuel stations in the area, whereas a geofence area 404g for a more populated area may have a fuel range threshold of two miles. Accordingly, the geofence module 302 dynamically determines the fuel range threshold for the new geofence area 404a-g, and the indicator module 206 enables the low-fuel indicator in response to the current fuel range for the vehicle 101 being less than or equal to the fuel range threshold for the new geofence area 404a-g.

Figure 4B:
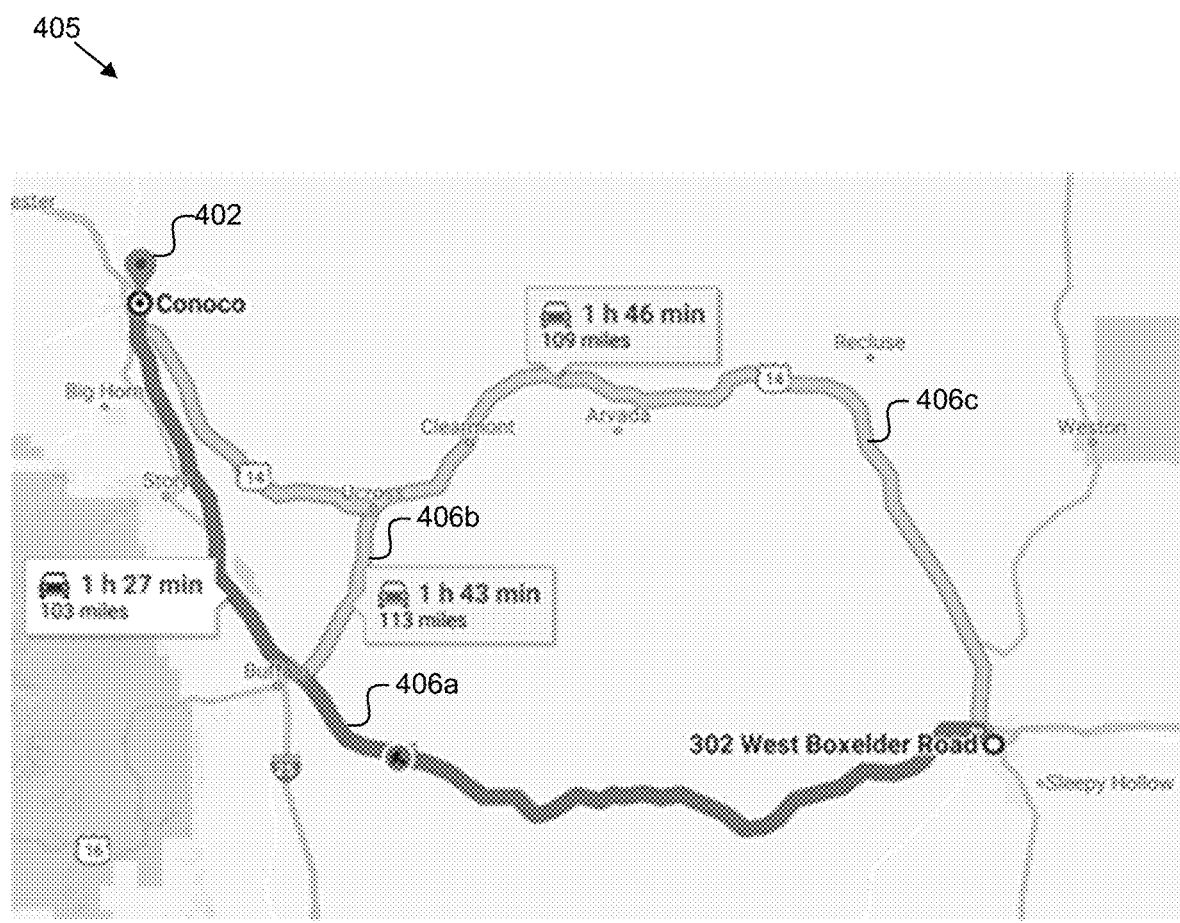
FIG. 4B illustrates one embodiment of using a vehicle's route for low-fuel indicator enablement based on fuel station locations.

FIG. 4B illustrates one embodiment of using a vehicle's route for low-fuel indicator enablement based on fuel station locations. In one embodiment, the route module 304 determines a route 406a-c for the vehicle 101. The route 406a-c may be a route programmed or entered in a navigation system or may be dynamically predicted by the route module 304 based on various factors such as the direction that the vehicle 101 is going and/or other information such as a user's search history, a user's social media activity, and/or the like.

In one embodiment, the location module 204 determines locations for fuel stations 402 along the route 406a-c. The route module 304 may then determine the fuel range threshold based on the vehicle's location, the distance to the next fuel station 402, and the distance to the fuel station 402 past the next fuel station 402. The fuel range threshold, for example, may be the fuel range calculated based on the distance to the fuel station 402 past the next fuel station 402. If the vehicle's current fuel range is less than or equal to the threshold fuel range, e.g., if the vehicle 101 does not have enough fuel to reach the fuel station 402 past the next fuel station 402 then the indicator module 206 may enable the low-fuel indicator for the vehicle 101 (to indicate that the user should stop at the next fuel station 402 to fill up before going further on the route 406a-c).

In some embodiments, there may be multiple different routes 406a-c available, e.g., in the navigation system. Accordingly, the route module 304 may calculate a fuel range threshold for each route 406a-c and may recommend or suggest the best route 406a-c to the user based on the current fuel range and the threshold fuel range for each route 406a-c. In some embodiments, the route module 304 only calculates the threshold fuel range for a route when the user selects a route on the map.

Figure 5:
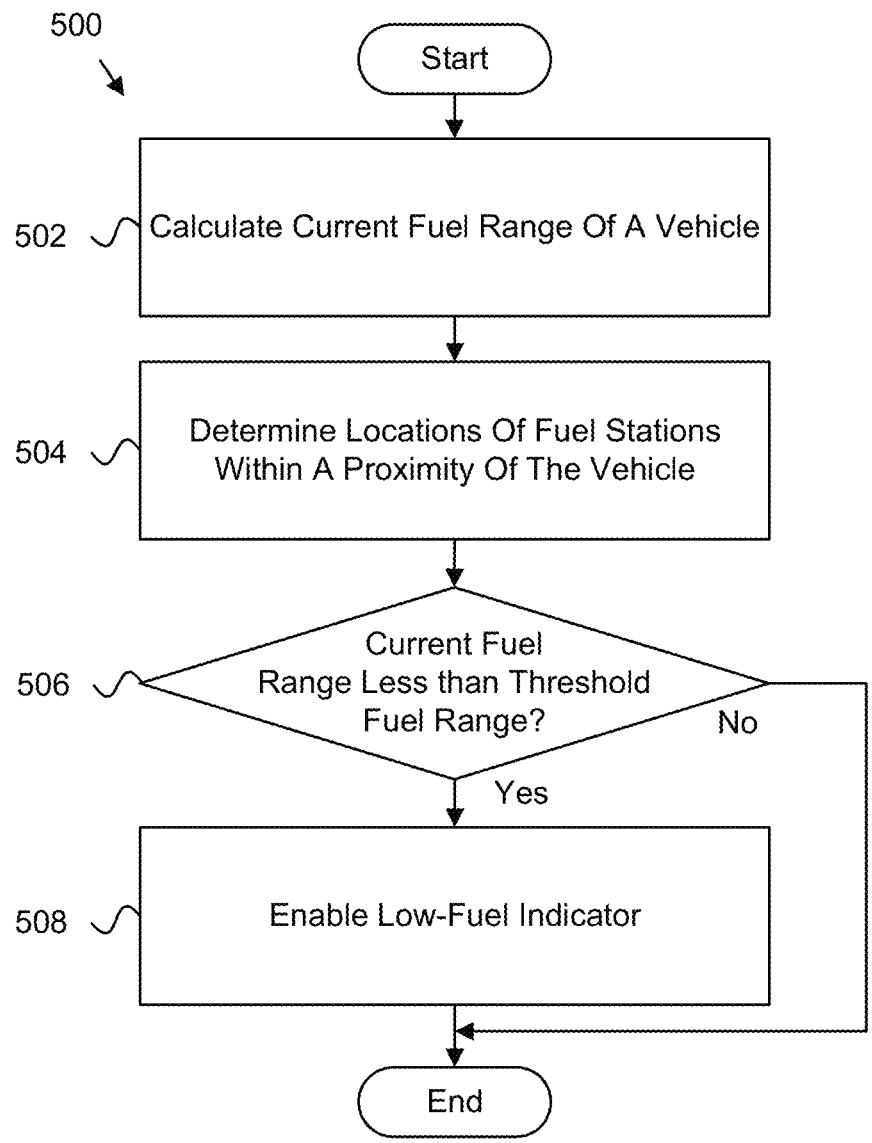
FIG. 5 is a schematic flow chart diagram illustrating one embodiment of a method for low-fuel indicator enablement based on fuel station locations.

FIG. 5 is a schematic flow chart diagram illustrating one embodiment of a method 500 for low-fuel indicator enablement based on fuel station locations. In one embodiment, the method 500 begins and calculates 502 a current fuel range for a vehicle 101. The method 500, in certain embodiments, determines 504 locations of fuel stations within a proximity of the vehicle 101. In some embodiments, the method 500 determines 506 if the current fuel range is less than or equal to a threshold fuel range (e.g., whether the current fuel range is enough to get to the next fuel station, but not the fuel station after it), which is determined based on the locations of the fuel stations. If so, the method 500 enables 508 a low-fuel indicator for the vehicle 101, and the method 500 ends. In various embodiments, the fuel range module 202, the location module 204, and the indicator module 206 perform the various steps of the method 500.

Figure 6:
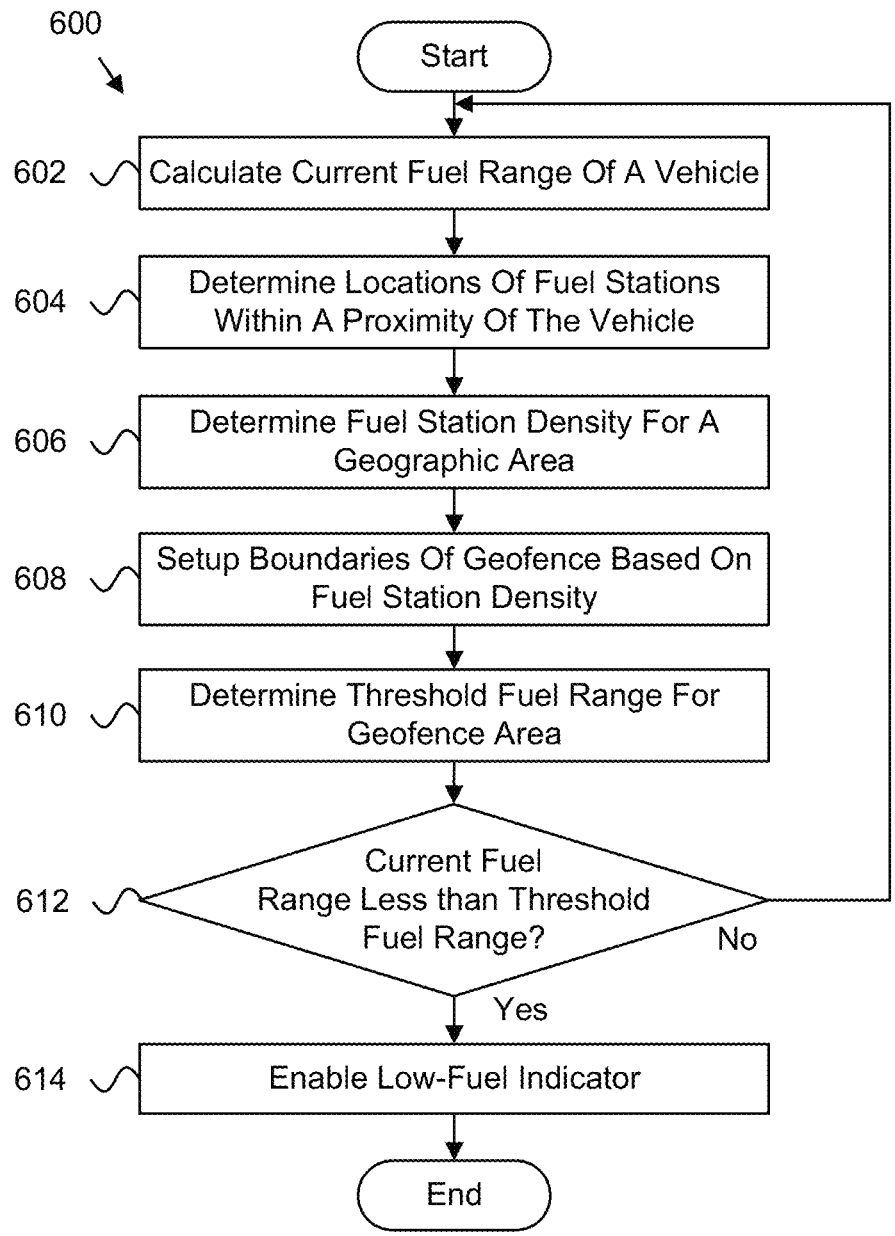
FIG. 6 is a schematic flow chart diagram illustrating one embodiment of another method for low-fuel indicator enablement based on fuel station locations.

FIG. 6 is a schematic flow chart diagram illustrating one embodiment of another method 600 for low-fuel indicator enablement based on fuel station locations. In one embodiment, the method 600 begins and calculates 602 a current fuel range for a vehicle 101. The method 600, in further embodiments, determines 604 locations of fuel stations that are within a proximity of the vehicle 101. In some embodiments, the method 600 determines 606 a fuel station density for a geographic area.

In certain embodiments, the method 600 sets up 608 boundaries of a geofence based on the fuel station density. In various embodiments, the method 600 determines 610 a threshold fuel range for the geofence area, e.g., based on the fuel station density, the (average) distances between the fuel stations, and/or the like. In some embodiments, the method 600 determines 612 whether the current fuel range for the vehicle 101 is less than or equal to the threshold fuel range for the geofence area. If not, the method 600 continues to calculate 602 the current fuel range for the vehicle 101. Otherwise, the method 600 enables 614 the low-fuel indicator for the vehicle 101, and the method 600 ends. In various embodiments, the fuel range module 202, the location module 204, the indicator module 206, and the geofence module 302 perform the various steps of the method 600.

Figure 7:
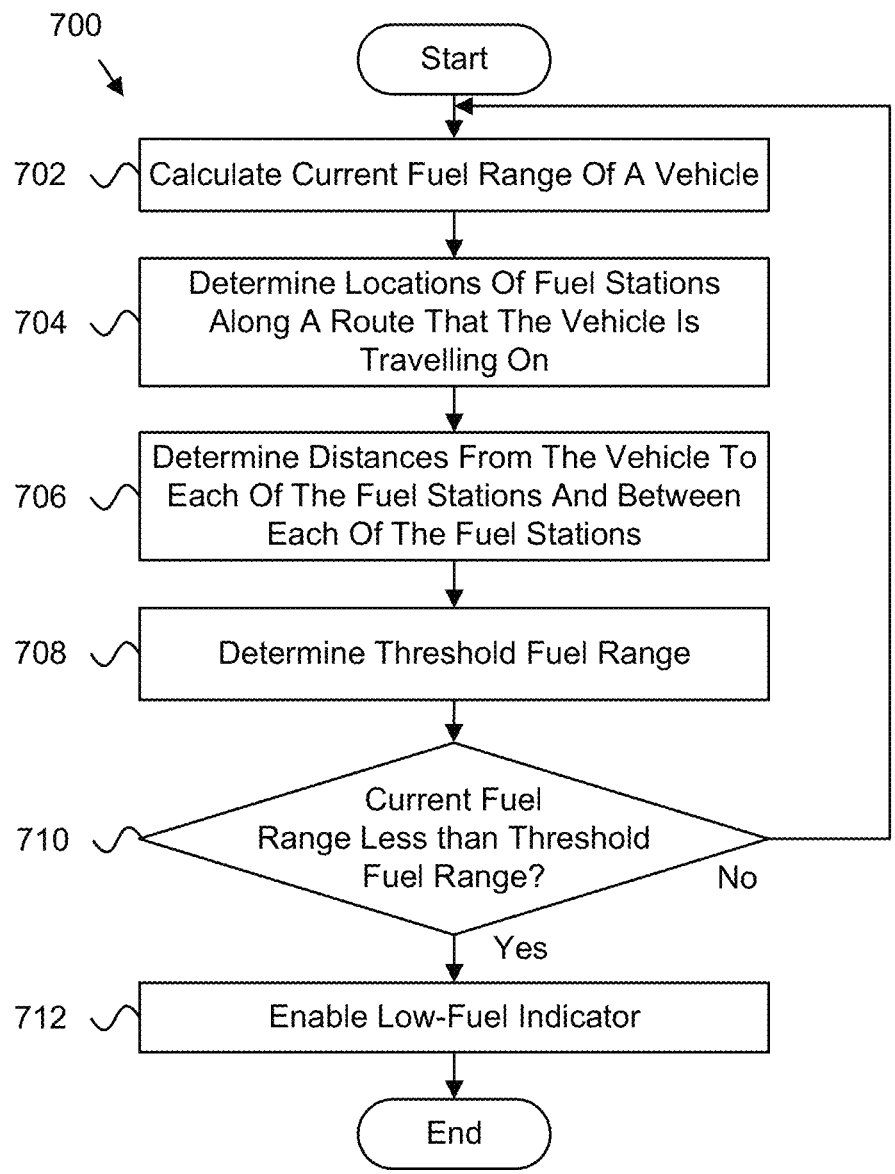
FIG. 7 is a schematic flow chart diagram illustrating one embodiment of another method for low-fuel indicator enablement based on fuel station locations.

FIG. 7 is a schematic flow chart diagram illustrating one embodiment of another method 700 for low-fuel indicator enablement based on fuel station locations. In one embodiment, the method 700 begins and calculates 702 a current fuel range for a vehicle 101. In further embodiments, the method 700 determines 704 locations of fuel stations along a route that the vehicle is travelling on.

In various embodiments, the method 700 determines 706 distances from the vehicle 101 to each of the fuel stations along the vehicle's route and also distances between each of the fuel stations. In one embodiment, the method 700 determines 708 the threshold fuel range, which may be determined according to the distance to the fuel station that is past the next fuel station that the vehicle 101 is approaching.

In one embodiment, if the method 700 determines 710 that the current fuel range for the vehicle 101 is not less than or equal to the threshold fuel range, then the method 700 continues to calculate 702 the current fuel range for the vehicle 101. Otherwise, the method 700 enables 712 the low fuel indicator, and the method 700 ends. In various embodiments, the fuel range module 202, the location module 204, the indicator module 206, and the route module 304 perform the various steps of the method 700.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
   a processor; and
   a memory that stores code executable by the processor to:
     calculate a current fuel range for a vehicle;
     determine locations of fuel stations within a proximity of the vehicle;
     determine a plurality of the fuel stations that are located along a route that the vehicle is travelling on;
     determine distances from the vehicle to each of the plurality of fuel stations and distances between each of the plurality of fuel stations; and
     enable a low-fuel indicator for the vehicle in response to the current fuel range of the vehicle being less than a threshold fuel range as determined based on the locations of the fuel stations, the threshold fuel range comprising the fuel range necessary to reach one or more fuel stations past the next fuel station along the route that the vehicle is travelling on.

2. The apparatus of claim 1, wherein the code is further executable by the processor to:
   determine a density of fuel stations within a first geographic area based on the locations of the fuel stations;
   setup boundaries of a first geofence area for the first geographic area based on the determined density of fuel stations, the first geofence area defining the threshold fuel range; and
   enable the low-fuel indicator of the vehicle in response to the current fuel range of the vehicle being less than the threshold fuel range for the first geofence area while the vehicle is within the first geofence area.

3. The apparatus of claim 2, wherein the code is further executable by the processor to:
   determine a density of fuel stations within a second geographic area based on the locations of the fuel stations, the second geographic area adjacent to the first geographic area;

setup boundaries of a second geofence area for the second geographic area based on the determined density of fuel stations within the second geographic area, the second geofence area defining a second threshold fuel range, the second threshold fuel range different than the threshold fuel range; and enable the low-fuel indicator of the vehicle in response to the current fuel range of the vehicle being less than the second threshold fuel range for the second geofence area while the vehicle is within the second geofence area.

4. The apparatus of claim 3, wherein the code is further executable by the processor to:
detect when the vehicle leaves the first geofence area and moves into the second geofence area;
receive the second fuel range threshold for the second geofence area in response to the vehicle moving into the second geofence area; and
enable the low-fuel indicator of the vehicle in response to the current fuel range of the vehicle being less than the second threshold fuel range for the second geofence area.

5. The apparatus of claim 2, wherein the first geographic area is selected in response to a population density for the first geographic area satisfying a population density threshold.

6. The apparatus of claim 2, wherein the threshold fuel range for the first geofence area is determined as a function of distances between the fuel stations within the first geofence area.

7. The apparatus of claim 1, wherein the route is preprogrammed in a navigation system, the plurality of fuel stations selected based on the preprogrammed route.

8. The apparatus of claim 1, wherein the route is dynamically determined according to a direction that the vehicle is traveling, the plurality of fuel stations selected based on the route that the vehicle is currently traveling on.

9. The apparatus of claim 1, wherein the code is further executable by the processor to constantly monitor the current fuel range of the vehicle and compare the current fuel range to the threshold fuel range to determine whether to enable the low-fuel indicator.

10. The apparatus of claim 1, wherein the fuel range is calculated as a function of one or more of an amount of gas remaining in a gas tank of the vehicle and an amount of electrical charge remaining in one or more batteries of the vehicle.

11. A method comprising:
calculating, by a processor, a current fuel range for a vehicle;
determining locations of fuel stations within a proximity of the vehicle;
determining a plurality of the fuel stations that are located along a route that the vehicle is travelling on;
determining distances from the vehicle to each of the plurality of fuel stations and distances between each of the plurality of fuel stations; and
enabling a low-fuel indicator for the vehicle in response to the current fuel range of the vehicle being less than a threshold fuel range as determined based on the locations of the fuel stations, the threshold fuel range comprising the fuel range necessary to reach one or more fuel stations past the next fuel station along the route that the vehicle is travelling on.

12. The method of claim 11, further comprising:
determining a density of fuel stations within a first geographic area based on the locations of the fuel stations;
setting up boundaries of a first geofence area for the first geographic area based on the determined density of fuel stations, the first geofence area defining the threshold fuel range; and
enabling the low-fuel indicator of the vehicle in response to the current fuel range of the vehicle being less than the threshold fuel range for the first geofence area while the vehicle is within the first geofence area.

13. The method of claim 12, further comprising:
determining a density of fuel stations within a second geographic area based on the locations of the fuel stations, the second geographic area adjacent to the first geographic area;
setting up boundaries of a second geofence area for the second geographic area based on the determined density of fuel stations within the second geographic area, the second geofence area defining a second threshold fuel range, the second threshold fuel range different than the threshold fuel range; and
enabling the low-fuel indicator of the vehicle in response to the current fuel range of the vehicle being less than the second threshold fuel range for the second geofence area while the vehicle is within the second geofence area.

14. The method of claim 13, further comprising:
detecting when the vehicle leaves the first geofence area and moves into the second geofence area;
receiving the second fuel range threshold for the second geofence area in response to the vehicle moving into the second geofence area; and
enabling the low-fuel indicator of the vehicle in response to the current fuel range of the vehicle being less than the second threshold fuel range for the second geofence area.

15. The method of claim 11, wherein the route is preprogrammed in a navigation system, the plurality of fuel stations selected based on the preprogrammed route.

16. The method of claim 11, wherein the route is dynamically determined according to a direction that the vehicle is traveling, the plurality of fuel stations selected based on the route that the vehicle is currently traveling on.

17. The method of claim 11, further comprising constantly monitoring the current fuel range of the vehicle and compare the current fuel range to the threshold fuel range to determine whether to enable the low-fuel indicator.

18. A program product comprising a non-transitory computer readable storage medium that stores code executable by a processor, the executable code comprising code to perform:
calculating a current fuel range for a vehicle;
determining locations of fuel stations within a proximity of the vehicle;
determining a plurality of the fuel stations that are located along a route that the vehicle is travelling on;
determining distances from the vehicle to each of the plurality of fuel stations and distances between each of the plurality of fuel stations; and
enabling a low-fuel indicator for the vehicle in response to the current fuel range of the vehicle being less than a threshold fuel range as determined based on the locations of the fuel stations, the threshold fuel range comprising the fuel range necessary to reach one or more fuel stations past the next fuel station along the route that the vehicle is travelling on.

19. The apparatus of claim 8, wherein the route is dynamically determined based on one or more of the user search activity, social media activity, email conversations, and text messages.

20. The method of claim 16, wherein the route is dynamically determined based on one or more of the user search activity, social media activity, email conversations, and text messages.

\* \* \* \* \*